Nov. 23, 1926.
S. H. LEVY
SCOOP
Filed Oct. 22, 1924
1,607,765
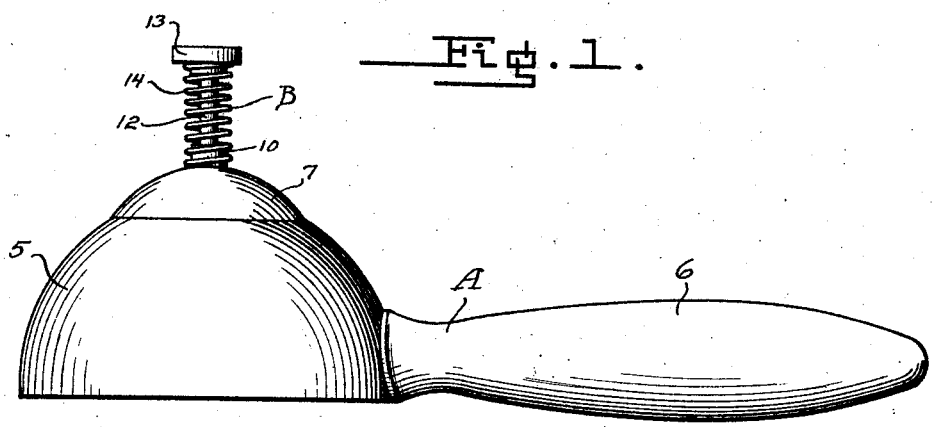
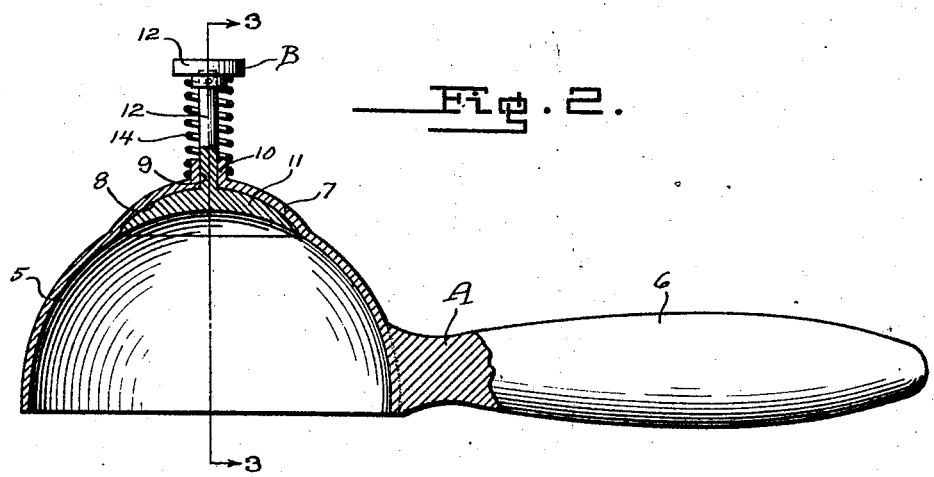
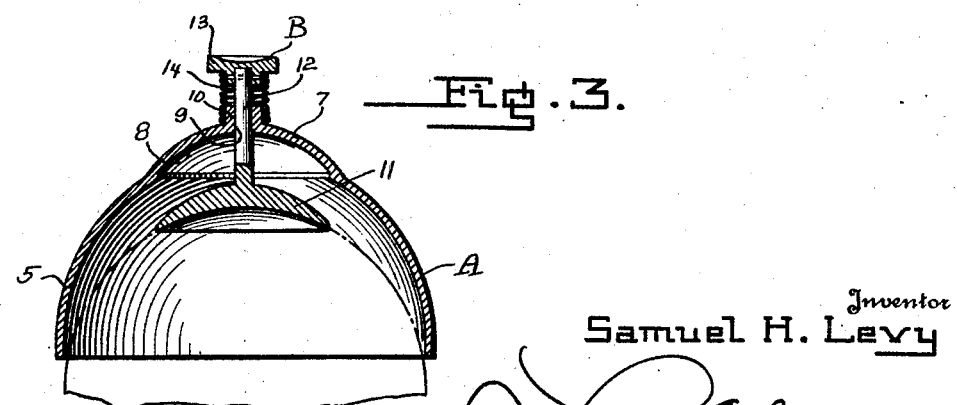
Inventor
Samuel H. Levy Patented Nov. 23, 1926.

1,607,765

UNITED STATES PATENT OFFICE.

SAMUEL H. LEVY, OF BROOKLYN, NEW YORK.

SCOOP.

Application filed October 22, 1924. Serial No. 745,228.

My present invention relates to scoops, and more particularly to improvements in scoops as used for dipping a predetermined amount of ice cream or similar substances, and expelling the same from the scoop by the manipulation of a manually operated ejecting means.

The primary object of the invention is to provide an improved ice cream scoop embodying an expelling means so associated with the bowl portion of the scoop, as to permit of the hand gripping portion of the scoop being disposed close to the bowl portion, thereby permitting of a more firm and less tiresome grip on the handle when dipping with the scoop.

A further object of the invention is to provide a scoop of the character described which is relatively short, thereby permitting of the scoop being readily placed at various angles within an ice cream container when dipping ice cream therefrom.

A still further object of the invention is to provide an ice cream scoop embodying an expelling means which is simple in operation and which embodies a comparatively few number of parts.

Other objects and advantages of the invention will be apparent during the course of the following detailed description, taken in connection with the accompanying drawing, forming a part of this specification, and in which drawing:—

Figure 1 is a view in side elevation of an ice cream scoop constructed in accordance with my invention;

Figure 2 is a central sectional view through the bowl portion of the scoop; and, Figure 3 is a section on line 3—3 of Figure 2, looking in the direction of the arrows, and showing the ejector in a position for expelling the ice cream from the bowl portion.

Referring to the drawing in detail, and wherein similar reference characters designate corresponding parts throughout the several views; the letter A may generally designate the improved dipper, and B the expelling means for ejecting the material from the bowl portion of the dipper.

The dipper A, which is preferably constructed of metal of a suitable nature, embodies a hemispherical shaped bowl 5 having a relatively short hand grip or handle 6 welded or otherwise secured adjacent the outer edge or mouth thereof and extending radially from the bowl. Formed integral with and at the base of the bowl 5, is a cup or pocket 7 having its inner or concaved side 8 of smaller radius of curvature than the concaved side of the bowl. A radially disposed aperture 9 is provided in the base of the cup 7, and extends outwardly through a sleeve or guide 10 formed integral with the cup and which extends at a right angle to the major axis of the handle 6.

Referring now to the expelling means B, the same preferably embodies a plunger formed with a concavo-convex shaped head 11 having an axially disposed rod 12 extending from the convexed side thereof and adapted for reciprocatory sliding movement in the guide 10. This rod 12 which projects exteriorly of the bowl 5, has attached to its outer end a button or thumb engaging portion 13, which also acts as an abutment for one end of a coil spring 14 which is disposed about the rod 12 with its inner end abutting against the cup 7, for normally retaining the head 11 in seated relation to the cup.

The concavo-convex head 11, has its convex side of an equal radius of curvature as that of the inner or concaved side 8 of the cup 7, while the concaved side of the head is of an equal radius of curvature as that of the inner surface of the bowl 5. Thus it will be seen that when the head 11 is in a retracted or seated position within the cup 7, the inner or concaved side of the head will form a continuation of the inner surface of the bowl, so that when the ice cream is ejected from the scoop, a semi-spherical shaped mass of ice cream will be formed for the formation of various ice cream dishes.

In operation, after the bowl has been filled with ice cream, the operator presses the plunger inwardly, and through action of the head 11 acting upon the crown of the cream, the cream will be readily severed from the inner wall of the bowl, and upon releasing pressure upon the plunger the coil spring 14 will return the ejecting plunger to a normal position.

From the foregoing description of this invention, it is obvious that a scoop has been provided embodying novel features of construction, and possessing practical merit, in that the same will facilitate the handling of ice cream or similar substances without the usual amount of effort required for handling such substances as when the hand gripping portion of the device is disposed at a point not adjacent to bowl of the scoop, and wherein the ejecting means is devoid of all levers and gears which tend to render the customary types of devices of this character unsanitary after a short period of use.

Various changes in the shape, size and arrangement of parts may be made to the form of the invention herein shown and described, without departing from the spirit of the invention or the scope of the claims.

I claim:—

1. A scoop of the class described comprising a hemispherical shaped bowl having a pocket provided with an aperture formed in the base thereof, a hand grip extending laterally from the mouth of the bowl, a rod slidable in said aperture at a right angle to the major axis of the hand grip, a head carried by the inner end of the rod having an inner concaved face conforming to the inner contour of the bowl and having its opposite side conforming to the contour of the pocket, a finger engaging button carried by the outer end of the rod, and a coil spring disposed about said rod for normally retaining said head in seated relation within the pocket.

2. A scoop of the class described comprising a bowl having a pocket formed in the base thereof, a hand grip extending laterally from the mouth of the bowl, a sleeve formed radially of the pocket, a rod slidable in said sleeve, a concavo-convex shaped head carried by the inner end of the rod and having its concave side of equal radius of curvature as that of the inner surface of the bowl and forming a continuation thereof, and a finger engaging button carried by the outer end of the rod for imparting a reciprocating motion to said head.

3. A scoop of the class described comprising a bowl having a pocket formed in the base thereof, of smaller radius of curvature than the convex side of the bowl, a hand grip extending laterally from the mouth of the bowl, a sleeve formed radially of the pocket, a rod slidable in said sleeve at a right angle to the major axis of the hand grip, a convexo-concave shaped head carried by the inner end of the rod, having its convex side of equal radius of curvature as that of the pocket, and having its concave side of equal radius of curvature as the inner surface of the bowl, and a finger engaging button carried by the outer end of the rod for imparting a reciprocatory motion to said head.

SAMUEL H. LEVY.